(12) United States Patent
Cunningham

(10) Patent No.: US 10,401,678 B2
(45) Date of Patent: Sep. 3, 2019

(54) SYSTEMS, APPARATUS, AND METHODS FOR AN ELECTROMAGNETIC INTERFERENCE SHIELDING OPTICAL POLARIZER

(71) Applicant: Applied Materials, Inc., Santa Clara, CA (US)

(72) Inventor: Kevin L. Cunningham, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 33 days.

(21) Appl. No.: 15/502,203

(22) PCT Filed: Aug. 14, 2015

(86) PCT No.: PCT/US2015/045269
§ 371 (c)(1),
(2) Date: Feb. 6, 2017

(87) PCT Pub. No.: WO2016/025830
PCT Pub. Date: Feb. 18, 2016

(65) Prior Publication Data
US 2017/0242298 A1     Aug. 24, 2017

Related U.S. Application Data

(60) Provisional application No. 62/037,412, filed on Aug. 14, 2014.

(51) Int. Cl.
*G02F 1/1333*       (2006.01)
*G02F 1/1335*       (2006.01)
(Continued)

(52) U.S. Cl.
CPC ..... *G02F 1/133536* (2013.01); *G02B 6/0051* (2013.01); *G02B 6/0055* (2013.01);
(Continued)

(58) Field of Classification Search
CPC ..................................................... G02B 5/3058
See application file for complete search history.

(56) References Cited

U.S. PATENT DOCUMENTS 6,122,103 A    9/2000  Perkins
6,288,840 B1   9/2001  Perkins
(Continued)

FOREIGN PATENT DOCUMENTS

CN    103676266 B    5/2017
EP       1635199       3/2006
(Continued)

OTHER PUBLICATIONS

International Search Report and Written Opinion of International Application No. PCT/US2015/045269 dated Nov. 27, 2015.
(Continued)

*Primary Examiner* — James A Dudek
(74) *Attorney, Agent, or Firm* — Patterson + Sheridan, LLP

(57) ABSTRACT

Embodiments of the present invention provide systems, apparatus, and methods for a shielding and reflective optical polarizer. The polarizer includes a fine wire array of optically reflective and electrically conductive lines; and a coarse grid of optically reflective and electrically conductive lines. The fine wire array and the coarse grid are electrically coupled each other and to a grounding terminal. Numerous additional aspects are disclosed.

14 Claims, 10 Drawing Sheets

(51) Int. Cl.
*F21V 8/00* (2006.01)
*G02F 1/1368* (2006.01)
*G02F 1/1362* (2006.01)

(52) U.S. Cl.
CPC ........ *G02F 1/1368* (2013.01); *G02F 1/13338* (2013.01); *G02F 2001/133334* (2013.01); *G02F 2001/133548* (2013.01); *G02F 2001/136222* (2013.01)

(56) References Cited

U.S. PATENT DOCUMENTS

| | | |
|---|---|---|
| 6,813,077 B2 | 11/2004 | Borrelli |
| 6,844,971 B2 | 1/2005 | Silverstein |
| 7,046,442 B2 | 5/2006 | Suganuma |
| 7,940,342 B2 | 5/2011 | Lee |
| 8,014,068 B2 | 9/2011 | Cheong |
| 8,184,216 B2 | 5/2012 | Lee |
| 8,233,104 B2 | 7/2012 | Lee |
| 8,269,904 B2 | 9/2012 | Lee |
| 2006/0118514 A1 | 6/2006 | Little et al. |
| 2008/0100781 A1* | 5/2008 | Choo ................ G02F 1/133536 349/96 |
| 2008/0117509 A1 | 5/2008 | Hayashi et al. |
| 2008/0143638 A1 | 6/2008 | Kim |
| 2010/0182524 A1* | 7/2010 | Nomura ............ G02F 1/133308 349/40 |
| 2010/0277660 A1 | 11/2010 | Little |
| 2011/0304785 A1 | 12/2011 | Ge et al. |
| 2012/0160802 A1 | 6/2012 | Kim et al. |
| 2013/0114027 A1 | 5/2013 | Hasegawa et al. |
| 2013/0300986 A1 | 11/2013 | Kang |
| 2015/0212239 A1* | 7/2015 | Park ..................... G02B 5/3058 216/24 |

FOREIGN PATENT DOCUMENTS

| | | |
|---|---|---|
| TW | 20060087 A1 | 1/2006 |
| WO | WO2007116972 | 10/2007 |
| WO | WO2012053756 A2 | 4/2012 |
| WO | WO2013168849 | 11/2013 |

OTHER PUBLICATIONS

International Preliminary Report on Patentability of International Application No. PCT/US2015/045269 dated Feb. 23, 2017.

Seo et al., "Experimental and Simulation Study of the Optical Performances of a Wide Grid Polarizer as a Luminance Enhancement Film for LCD Backlight Applications," Journal of the Optical Society of Korea vol. 16, No. 2, Jun. 2012, pp. 151-156.

Sergan et al., "Measurement and modeling of optical performance of wire grids and Liquid-crystal displays utilizing grid polarizers," J. Opt. Soc. Am. A, vol. 19, No. 9, Sep. 2002, pp. 1872-1885.

Yang et al., "Broadband Polarizers Using Dual-Layer Metallic Nanowire Grids," IEEE Photonics Technology Letters, vol. 20, No. 9, May 1, 2008, pp. 697-699.

Ahn et al., "Bilayer metal wire-grid polarizer fabricated by roll-to-roll nanoimprint lithography on flexible plastic substrate," Journal of Vacuum Science & Technology B 25, pp. 2388-2391 (2007).

Schnabel et al., "Study on polarizing visible light by subwavelength-period metal-stripe gratings," Optical Engineering, vol. 38 No. 2, Feb. 1999, pp. 220-226.

Ahn et al., "High-performance wire-grid polarizers using jet and Flash™ imprint lithography," J. Micro/Nanolith. MEMS MOEMS 12(3), 031104-01-031104-9 (Jul.-Sep. 2013).

Taiwan Patent Application No. 1041226605, Official Letter and Search Report dated Apr. 18, 2019, 7 pages.

\* cited by examiner

300B

SYSTEMS, APPARATUS, AND METHODS FOR AN ELECTROMAGNETIC INTERFERENCE SHIELDING OPTICAL POLARIZER

RELATED APPLICATION

The present application claims priority to U.S. Provisional Application No. 62/037,412, filed Aug. 14, 2014 and titled "SYSTEMS, APPARATUS, AND METHODS FOR AN ELECTROMAGNETIC INTERFERENCE SHIELDING OPTICAL POLARIZER", which is incorporated herein by reference in its entirety for all purposes.

FIELD

The present invention relates to optical polarizers and, more specifically, to systems, apparatus, and methods for optical polarizers that provide electromagnetic interference (EMI) shielding.

BACKGROUND

Existing liquid crystal displays (LCDs) modulate light by placing liquid crystals (LCs) between two optical polarizers of crossed (e.g., rotated 90 degrees relative to each other) polarization. Consider a photon moving through Cartesian space towards a pair of crossed optical polarizers. If the photon is polarized along the x-axis and is propagating along the z-axis, it will pass through the first optical polarizer if the polarizer is aligned along the x-axis. When this photon arrives at the second, crossed polarizer which is aligned along the y-axis, the photon will be absorbed or reflected, depending on the type of polarizer. In principle, no light will get through the crossed polarizers. However, the orientation of the LC material disposed between the polarizers can rotate the polarization of the photons to allow light through the stack. The amount of rotation is determined by an electric field which is controlled by thin-film transistors (TFTs) fabricated within the LCD.

Conventional optical polarizers are absorptive. For example, more than 50% of the unpolarized light produced by the backlight of the LCD is absorbed by the first polarizer alone. Such arrangements essentially consume light, converting the energy into heat within the first polarizer and are therefore inefficient.

Optical filters (other than polarizers) are used to adjust performance characteristics of displays such as the degree of neutrality and level of transmitted color, the level of reflected radiation, and the transmission levels of undesirable near infrared and electromagnetic interference (EMI) radiation. Such filters with EMI shielding have been developed that can modify visible radiation, infrared radiation, adjust color, reduce reflection, and can provide EMI radiation shielding between various electronic components within device (including the display) from each other. Typically, a number of different optical filter films along with a separate EMI shielding film (e.g., a film with a transparent conductive mesh configuration) have been used to produce the final, desired visual output of the device. Some of these optical filters have employed interference stacks (e.g., Fabry-Perot) of alternating conductors and dielectrics to adjust the optical performance characteristics of the filters, while also providing EMI shielding. The conductors in these stacks are usually separate metal layers and the dielectrics are usually metal oxides layers. The metal oxide layers can have a very slow deposition rate which can lead to high production costs. The use of multiple optical filters in electronic devices to obtain desired performance characteristics can increase costs, make the devices bulky, and cause considerable loss in transmission of the desired images.

Therefore, what is needed are improved systems, apparatus, and methods for both providing optical polarization efficiently and EMI shielding without increasing the expense and bulk of displays.

SUMMARY

In some embodiments, the present invention provides a liquid crystal display system. The LCD system includes a first shielding reflective optical polarizer; a color filter disposed adjacent the first shielding reflective optical polarizer; a thin film transistor and liquid crystal layer disposed adjacent the color filter; a second shielding reflective optical polarizer disposed adjacent the thin film transistor and liquid crystal layer; and a backlight assembly including a light source, a diffuser and a back reflector, the backlight assembly disposed adjacent the second shielding reflective optical polarizer.

In some other embodiments, the present invention provides a shielding and reflective optical polarizer apparatus. The polarizer apparatus includes a fine wire array of optically reflective and electrically conductive lines; and a coarse grid of optically reflective and electrically conductive lines. The fine wire array and the coarse grid are electrically coupled each other and to a grounding terminal.

In yet other embodiments, the present invention provides a method for manufacturing a polarizer apparatus. The method includes forming a fine wire array on a substrate wherein the fine wire array includes conductive and reflective lines; forming a coarse grid on the fine wire array wherein the coarse grid includes conductive and reflective lines; and electrically coupling the fine wire array and the coarse grid to a grounding terminal.

Still other features, aspects, and advantages of the present invention will become more fully apparent from the following detailed description, the appended claims, and the accompanying drawings by illustrating a number of exemplary embodiments and implementations, including the best mode contemplated for carrying out the present invention. Embodiments of the present invention may also be capable of other and different applications, and its several details may be modified in various respects, all without departing from the spirit and scope of the present invention. Accordingly, the drawings and descriptions are to be regarded as illustrative in nature, and not as restrictive. The drawings are not necessarily drawn to scale. The description is intended to cover all modifications, equivalents, and alternatives falling within the spirit and scope of the claims.

DESCRIPTION

Figure 1:
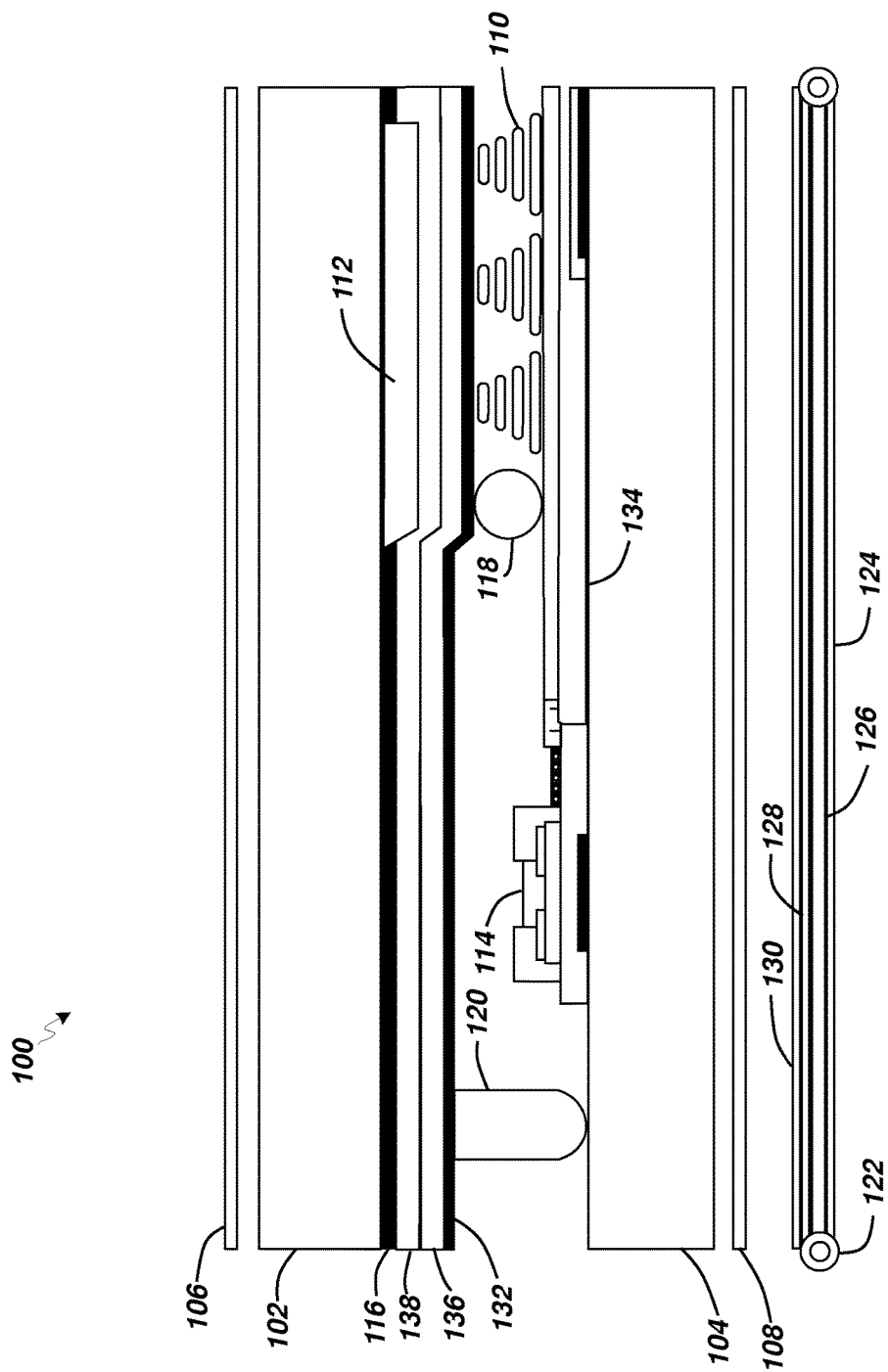
FIG. 1 is a schematic block diagram depicting an example liquid crystal display (LCD) system according to embodiments of the present invention.

Embodiments of the present invention provide systems, apparatus, and methods for an electromagnetic interference (EMI) shielding optical polarizer. As mentioned above, conventional polarizers are absorptive. Approximately 50% of the light produced by the backlight of an LCD is absorbed by the first polarizer (e.g., the polarizer between the backlight and the LC/TFT layers). In contrast, the polarizers of embodiments of the present invention are reflective. Photons with a polarization opposite of the reflective polarizer (that would normally be absorbed in a conventional polarizer) are reflected back into the diffuser plate that is between the backlight and the lower polarizer. The back reflector of the backlight "re-reflects" the light back through the diffuser which scrambles the polarization of the light so that approximately 50% of this re-reflected light will pass through the first polarizer. The remaining approximately 50% of the re-reflected light would again be reflected off the first polarizer and then off the back reflector and back through the diffuser again to the polarizer with approximately 50% being passed and approximately 50% being reflected. This light recycling repeats until virtually all the light passes through the polarizer with the correct polarization. Prior art methods of "recycling" light that would otherwise be absorbed use expensive additional layers (e.g., Vikuiti™ Reflective Polarizer Films (DBEF) available from 3M Corporation) that add additional cost and thickness to the LCD system. Thus, embodiments of the present invention improve the energy efficiency of the LCD significantly without introducing additional expense and stack thickness.

In addition to inefficiency, conventional LCDs suffer from electrical noise between the various devices that are integrated together within the LCD. Most notably is the electrical noise between the electrical circuits that are used to sense touch on the surface of the LCD (the touch panel) and the circuits within the LCD that control the orientation of the liquid crystals (LC) (e.g., the thin film transistor (TFT) array). It is also possible to have electrical noise generated by several other circuits, including those that control the backlight (e.g., local dimming), those that are associated with other sensors that may be built into the display (e.g., pressure, temperature, light sensors), and other circuits within the device that are not directly display related. Further, newer technologies such as haptic devices that provide simulated tactile feedback to display users include circuitry adjacent the LC control circuits that can also generate interfering noise. These noise sources constrain the design on the LCD, diminish the sensitivity of the sensors, and can interfere with operation of devices that use LCDs.

The reflective polarizers of embodiments of the present invention also provide shielding of the electromagnetic noise that these various circuits can generate. By using a conductive wire grid (e.g., including an array of parallel fine conductive wires) that is electrically grounded, the reflective polarizers provide a layer of electrical shielding between the circuits within the LCD that control LC orientation and all other outside circuits, which can include, for example, touch sensors, pressure sensors, temperature sensors, light sensors, and other sensors, as well as the circuits that control the backlighting and other devices (e.g., haptic devices) proximate to the LC control circuitry. In some embodiments, the reflective and conductive polarizer can be surrounded by a conductive peripheral border connected to each wire wherein the peripheral border is grounded.

To function as a visible light polarizer, the conductive parallel lines are thin and closely spaced. For example, to polarize 400 nm light, the shortest wavelength the human eye can discern, a polarizer would have several (e.g., 3 or more) lines spaced to be within one wavelength. For example, a fine wire array with a line pitch of approximately 60 nm to approximately 130 nm and a line width of approximately 10 nm to approximately 30 nm can be used. In some embodiments, array lines with a pitch of approximately 100 nm and a line width of approximately 20 nm can be used. Other pitches and line widths can be used. In some embodiments, optical lithography techniques can be used to create such closely spaced conductive lines on a film or glass substrate and in other embodiments, imprint lithography techniques can be employed.

Further, in some embodiments, in addition to the fine wire array, a second coarser grid of reflective, conductive lines can be formed on the film or substrate along with (e.g., overlaid on or integral with) the fine wire array. The coarser grid can be patterned to match and align with the areas of the display that do not align directly with the light emitting portions of the pixels, for example, the black matrix and the TFTs. This further improves the EMI shielding and the reflection of light. In particular, light that passes through the black matrix and the TFTs is undesirable because these areas will appear dark gray, which will not provide an appealing appearance to the image on the LCD. In addition, if this light leakage varies across the LCD, there may be a visible distortion to the image which is unacceptable. By positioning the coarser grid so that it is aligned with the black matrix and the TFTs, this light leakage is minimized and the darkness and consistency of the black matrix is improved. Further, because the polarizer provides reflection in the area of the black matrix and the amount of light through these regions is decreased, the quality of the black matrix can be reduce and/or the absorptive layers in the black matrix region can be unnecessary. This benefit can further reduce the cost of LCD systems in accordance with embodiments of the present invention.

In some embodiments, the fine array of reflective, conductive lines (e.g., that provides the polarizing function and shielding) and the coarser grid of reflective, conductive lines aligned with the black matrix and TFTs (e.g., that enhances both the shielding function and the reflecting function) can both be formed concurrently as one grid with different line widths and pitches. In other embodiments, the fine array and the coarse grid can be formed separately but on the same film layer. This second method can simplify manufacturing since the tolerance for aligning the fine array over the LCs is wide while the tolerance for aligning the coarse grid is narrower but still relatively wide due to the larger area involved. In either case, the combination of the fine array and the coarse grid results in an EMI shielding reflective polarizer that enables a more energy efficient, thinner LCD with improved noise protection.

In some embodiments, the fine array of reflective, conductive lines (e.g., that provides the polarizing function and shielding) can be optimized for maximum light transmission for each color pixel by adjusting the height, width and pitch of the lines based upon the wavelength of the light (e.g., color) that is passed. In other words, by varying the height of the conductive lines off the substrate, the width of the lines relative to the pitch, and/or the pitch of the lines, based on the pixel colors over which the lines pass, the amount of light transmitted through the polarizer can be optimized. This fine array structure with varying height, width, and/or pitch can be fabricated using imprint lithograph by having different imprint patterns for each different color region so that etching back a metal layer deposited on a translucent imprinted structure would create a fine array with different heights at the appropriate locations.

Turning now to FIG. 1, a simplified example LCD system 100 according to embodiments of the present invention is depicted. The system 100 includes two glass substrates (e.g., upper glass substrate 102 and lower glass substrate 104) between two polarizers (e.g., upper polarizer 106 and lower polarizer 108). Between the glass substrates 102, 104, liquid crystals 110 are disposed below a color filter that includes pixels 112 and TFTs 114 within a black matrix 116. A spacer 118 is used to support and separate the color filter and the upper glass substrate 102 from the lower glass substrate 104. A seal 120 surrounds the liquid crystals 110. Light is provided by a backlight which can include LEDs or CCFL lamp tubes 122 that illuminate a back reflector 124 which passes the light through a light guide plate 126, a prism sheet 128, and the diffuser 130. In some embodiments, the LCD system 100 can include an alignment film 132 above the liquid crystals 110. A layer of row electrodes 134 below the liquid crystals 110 and a layer of column electrodes 136 above the liquid crystals 110 are also included. In some embodiments, the LCD system 100 can include an overcoat film 138 above the column electrodes 136.

As explained above, light that would have been absorbed by a conventional non-reflective polarizer is recycled by reflecting back any light that does not pass the lower polarizer 108. In addition, light that does not pass the upper polarizer 106 is reflected back by the upper polarizer 106 and recycled.

Figure 2:
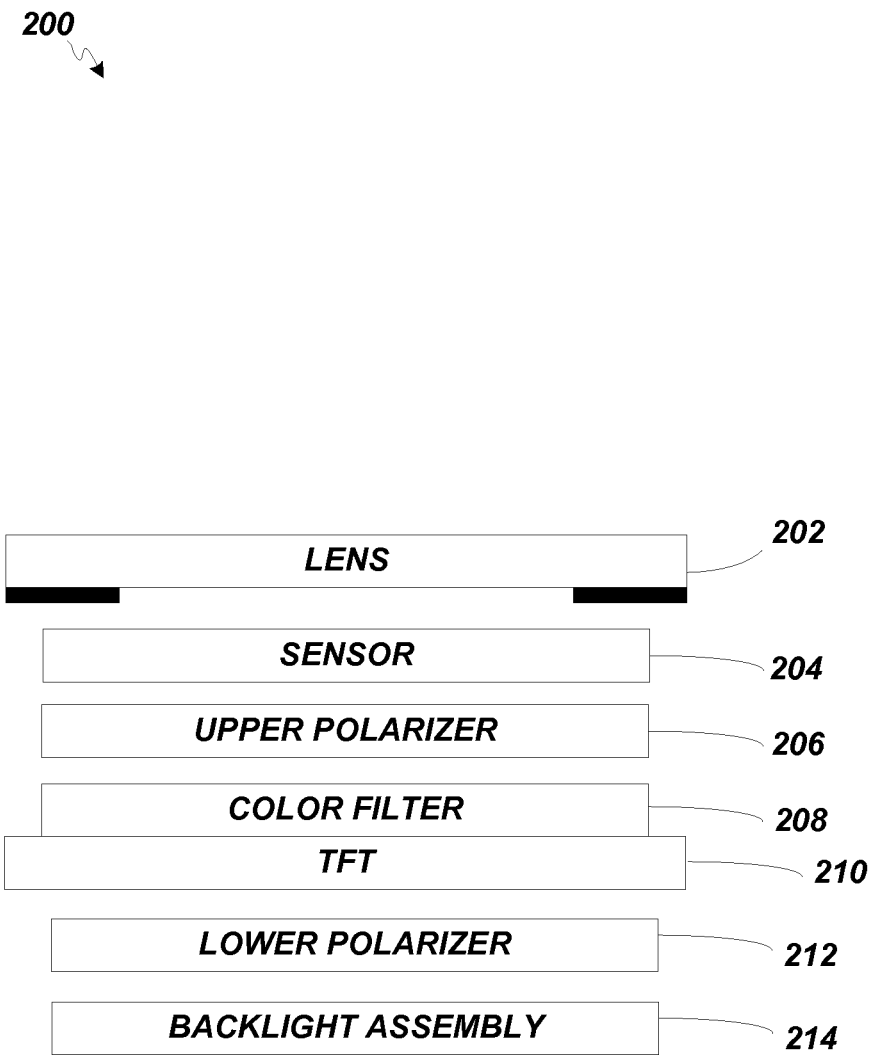
FIG. 2 is a schematic block diagram depicting an alternative example LCD system including touch sensor layers according to embodiments of the present invention.

FIG. 2 depicts a portion of an alternative LCD system 200 that includes a lens 202 with a sensor 204 (e.g., one or more of a touch sensor, a temperature sensor, a haptic device, etc.) between the lens 202 and the upper polarizer 206. A color filter 208 and the TFT layer 210 (e.g., TFT array, LCs, electrodes, etc.) are disposed below the upper polarizer 206. Below the TFT layer 210, a lower polarizer 212 is disposed between the backlight assembly 214 and the TFT layer 210. According to embodiments of the present invention, EMI noise generated by the sensor 204 is blocked from reaching the TFT layer 210 by the upper polarizer 206 which, in addition to being a reflective optical polarizer, is a grounded conductive EMI shield.

Figure 3A:
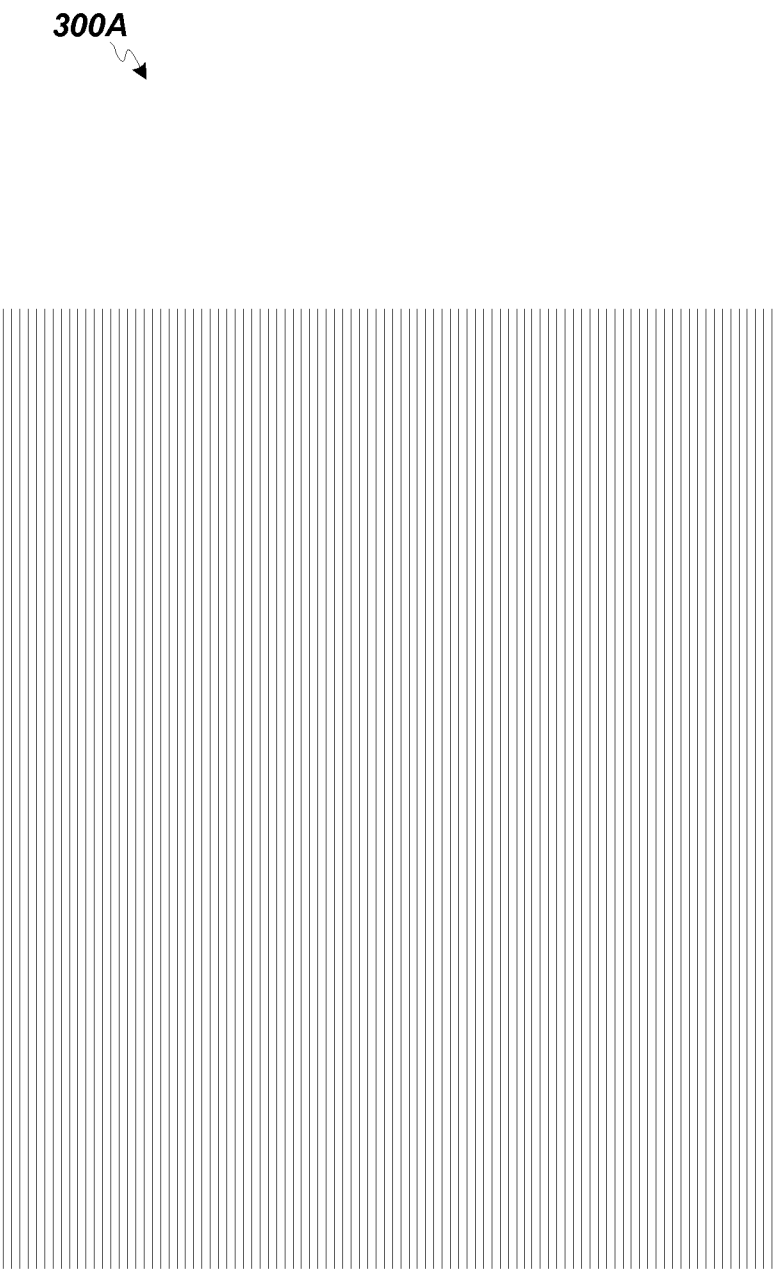
FIGS. 3A-3E illustrate example process steps for manufacturing an electromagnetic interference (EMI) shielding optical polarizer apparatus according to embodiments of the present invention.

FIGS. 3A to 3E depict an example sequence of constructing an EMI shielding reflective optical polarizer according to embodiments of the present invention. As shown in FIG. 3A, a fine wire array 300A is formed on a substrate or thin film. The fine wire array 300A covers the entire substrate with regular parallel conductive reflective lines. As discussed above, to function as a visible light polarizer, the conductive parallel lines are thin and closely spaced. For example, to polarize >400 nm light, a polarizer would have several (e.g., 3 or more) lines spaced to be within one wavelength. For example, a fine wire array with a line pitch of approximately 60 nm to approximately 130 nm and a line width of approximately 10 nm to approximately 30 nm can be used. In some embodiments, array lines with a pitch of approximately 100 nm and a line width of approximately 20 nm can be used. Other pitches and line widths can be used. In some embodiments, optical lithography techniques can be used to create such closely spaced conductive lines on a film or glass substrate and in other embodiments, imprint lithography techniques can be employed.

For example, in some embodiments, a fine wire array 300A can be fabricated by first creating an imprint on a film or glass substrate using nano-imprint lithography. Then the imprint is filled using, for example, physical vapor deposition (PVD) of aluminum or other metal. In some embodiments, there are optical advantages to first depositing a thin transparent oxide on the imprinted substrate and then filling the imprint with a conductive and reflective metal. The oxide can also be deposited using PVD. The excess metal can then be etched away leaving only the metal within the imprinted regions which will be a fine wire array 300A.

In an alternative embodiment, the fine wire array 300A can be fabricated by first depositing a blanket metal (e.g., aluminum or other reflective metal) layer via PVD. Then an imprint layer is deposited on the metal layer. Next the pattern of an imprint template is imprinted into the imprint layer and the imprint layer is cured with activation energy (e.g., UV light, heat, e-beam, etc.). The imprinted pattern in the cured imprint layer is relatively deep (e.g., thin layer of cured material) where the underlying metal layer is to be removed and relatively shallow (e.g., thicker layer of cured material) where the metal is to remain. The cured material is then used as a mask in a subsequent etch step where both the cured material and the metal are etched (e.g., using vacuum reactive ion etch (RIE) or wet etch techniques) until only a fine wire array 300A remains.

Figure 3B:
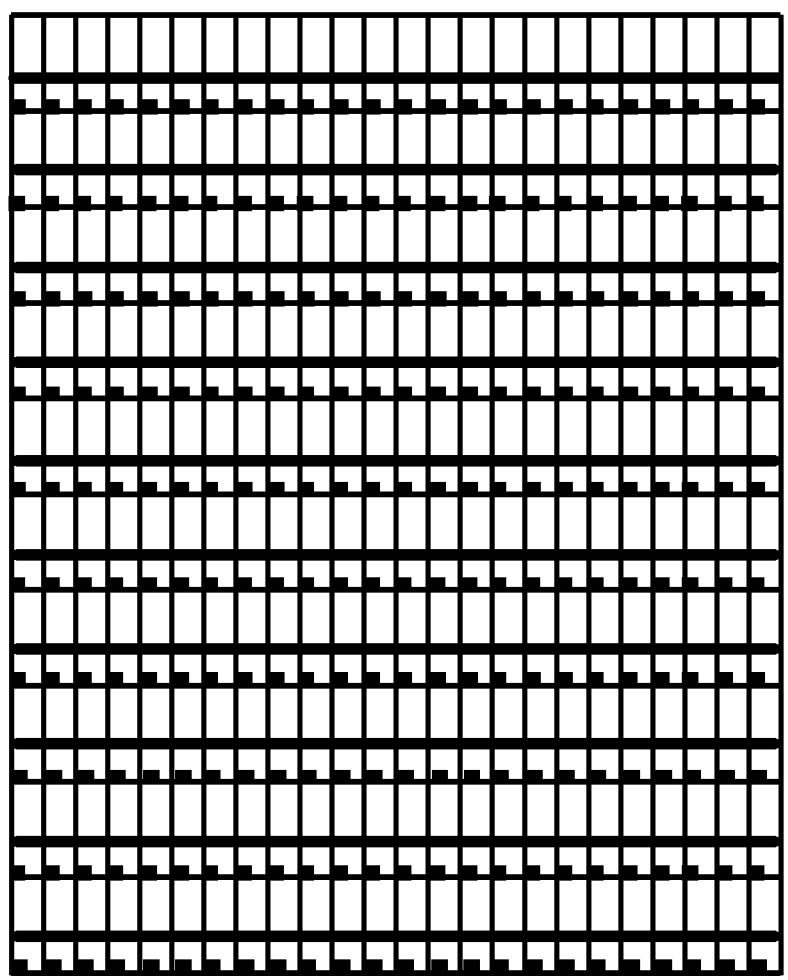

FIG. 3B depicts a coarse grid 300B separate from the fine wire array 300A for illustration purposes. Note that the coarse grid 300B has the same pattern as the black matrix pixel wells and the TFTs (e.g., the TFT areas are the square shapes in the lower corners of each pixel well). In some embodiments, the coarse grid 300B can be patterned separately from the fine wire array 300A. For example, after the fine wire array 300A is formed, the coarse grid 300B can be formed on top of the fine wire array 300A using photolithography. Alternatively, the coarse grid 300B can be formed and then the fine wire array 300A can be formed on the coarse grid. In another alternative embodiment, the fine wire array 300A and the coarse grid 300B can be formed on two separate layers. As mentioned above, forming the fine wire array 300A and the coarse grid 300B separately can simplify manufacturing because the fine wire array is independent of the pixel pattern of the particular LCD system whereas the coarse grid 300B is specific to the pixel pattern. Further, in some embodiments, it can be easier to imprint the fine wire array 300A and to use photolithography for the coarse grid 300B since the resolution of the coarse grid 300B part of the patterning does not need to be as precise. In yet another embodiment, both the fine wire array 300A and the coarse grid 300B can be formed concurrently using imprint lithography.

Figure 3C:
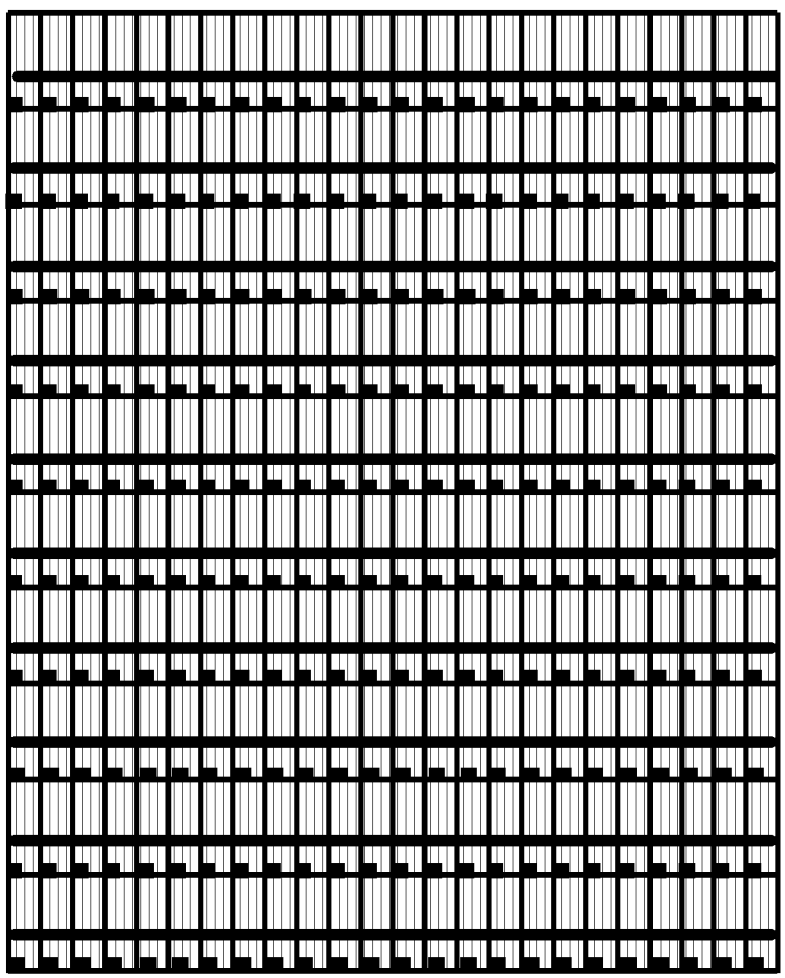
Figure 3D:
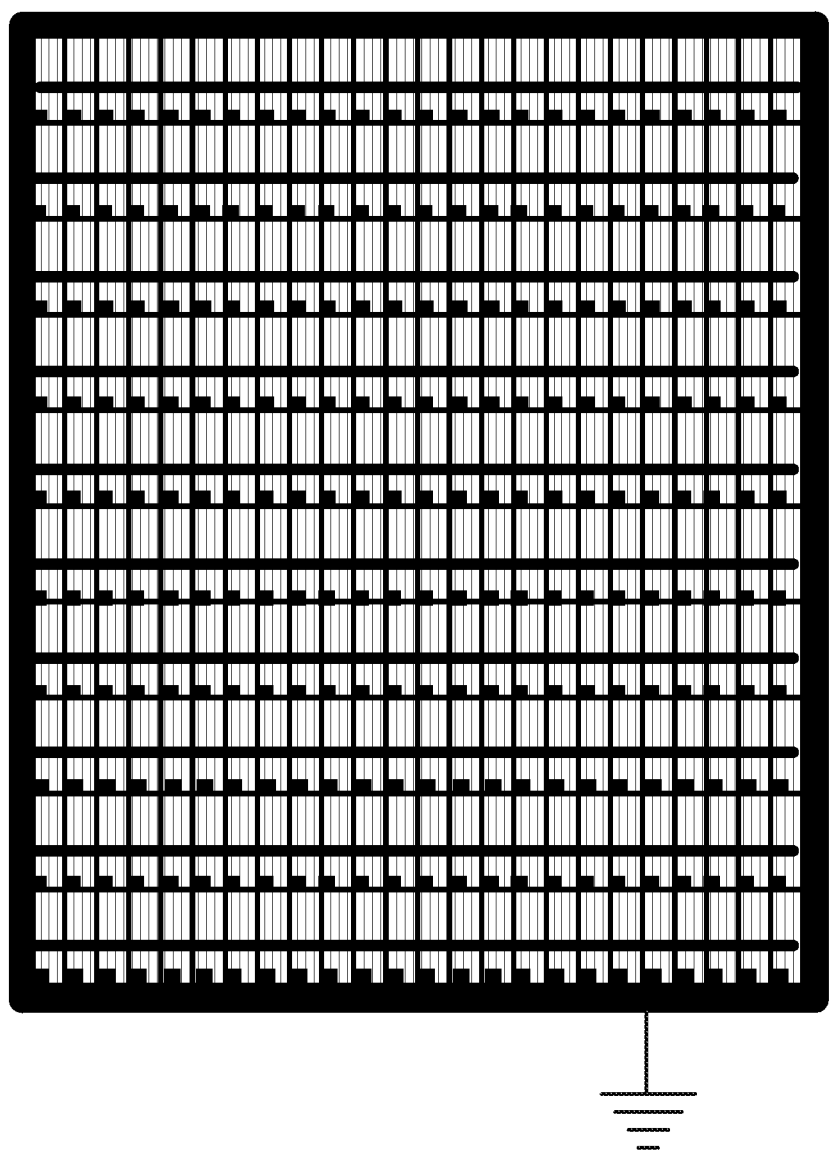
Figure 3E:
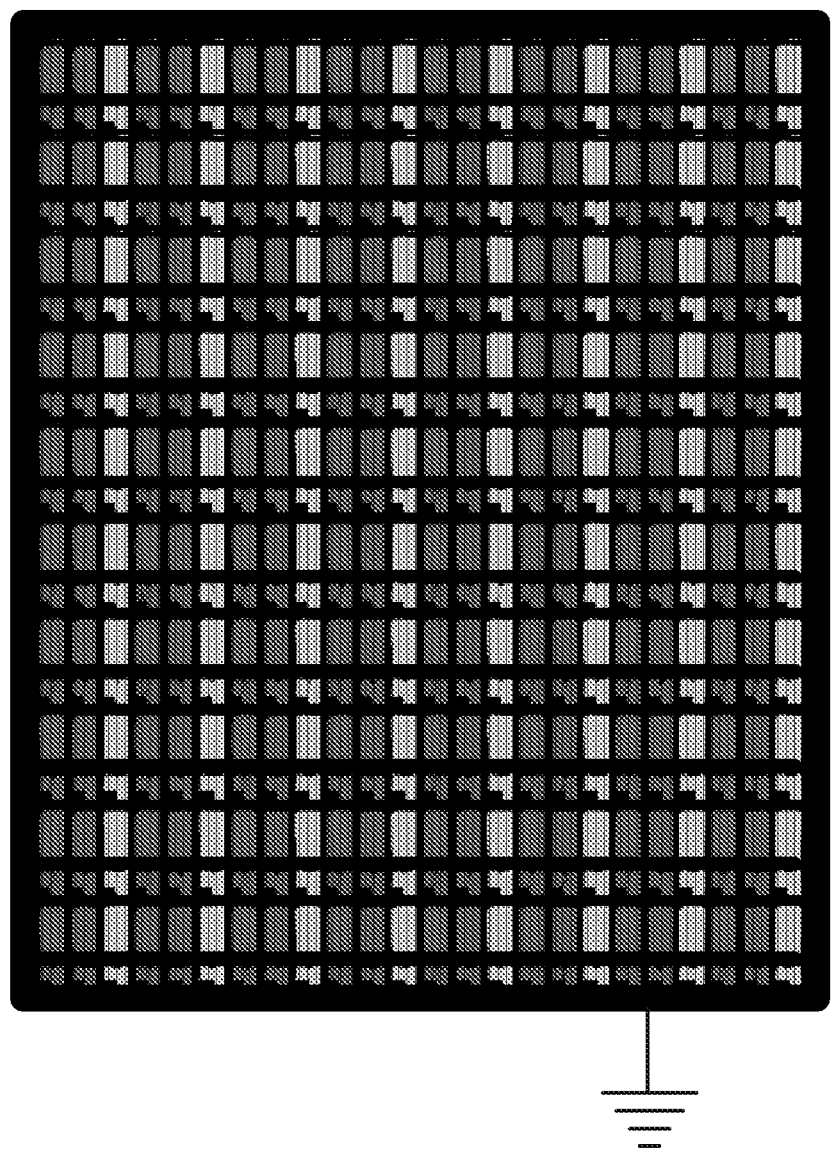

Regardless of which alternative method is used, the resulting shielding polarizer pattern 300C is depicted in FIG. 3C. To provide optimal grounding, the conductive lines of the shielding polarizer pattern 300C are coupled to and surrounded by a grounding frame at the periphery of the pattern to create an EMI shielding reflective optical polarizer 300D as depicted in FIG. 3D. FIG. 3E depicts a top view of an LCD system 300E with the EMI shielding reflective optical polarizer 300D disposed on and aligned with a TFT/LC layer.

Figure 4:
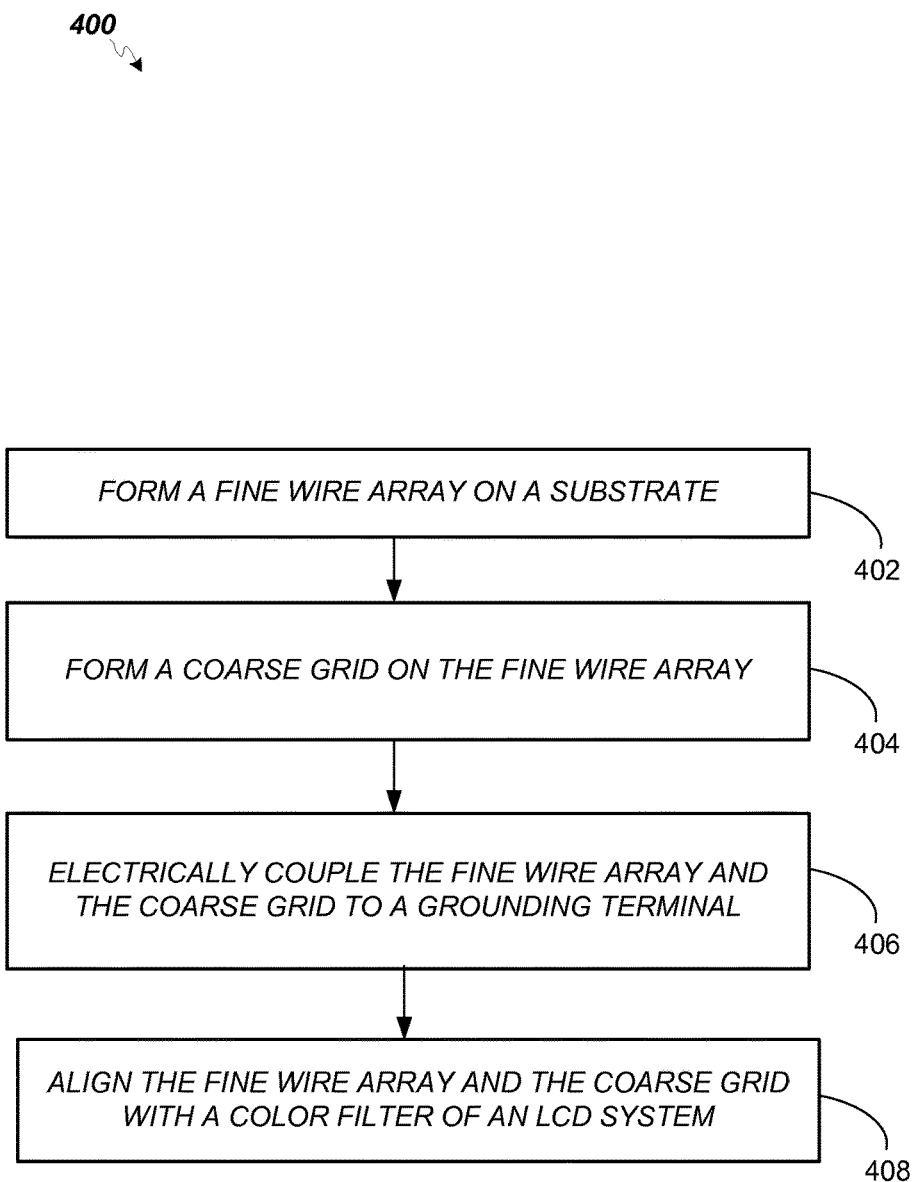
FIG. 4 is a flowchart illustrating a first example method of manufacturing an EMI shielding optical polarizer apparatus according to embodiments of the present invention.

Turning now to FIG. 4, a flowchart depicting an example method 400 of manufacturing an EMI shielding reflective optical polarizer is provided. Note that the order of the elements of the method 400 presented here is not intended to limit the method 400 to a particular order. Other orders are possible. A fine wire array is formed on a thin film or substrate (402). The fine wire array includes regularly spaced conductive and reflective lines spaced and sized to function as a polarizer of visible light. Concurrently, before, or subsequently, a coarse grid is formed with or on the fine wire array (404). The coarse grid is patterned to match the areas of an LCD that do not pass light. In other words, the coarse grid matches the pattern of the black matrix and TFT of an LCD. The lines of the coarse grid are also conductive and reflective, as well as being electrically coupled to the lines of the fine wire array. The fine wire array and the coarse grid are electrically coupled to a grounding terminal (406) and the fine wire array and the coarse grid are aligned with liquid crystals and a color filter of an LCD system (408).

Figure 5:
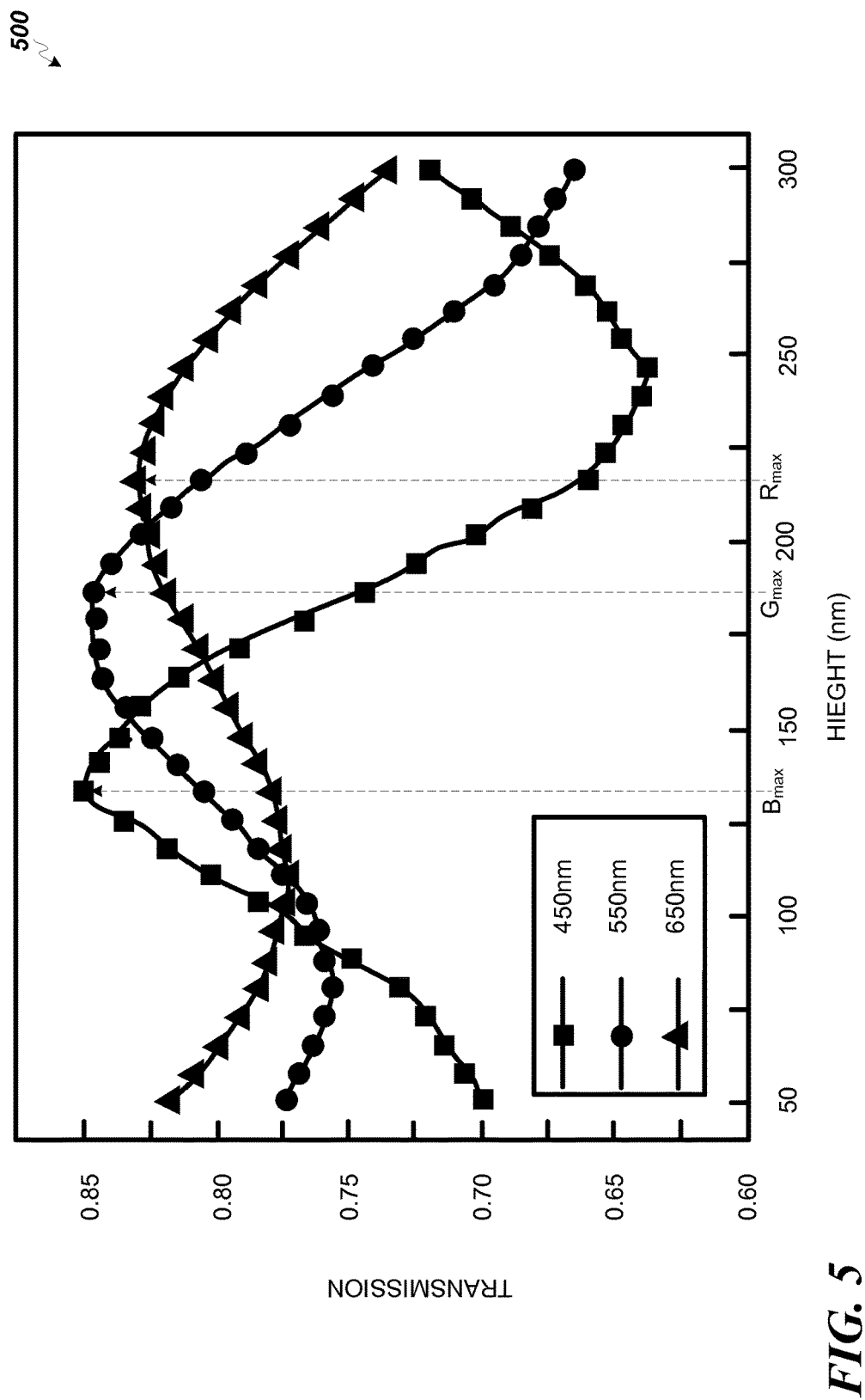
FIG. 5 is a graph illustrating that light transmission through a wire grid polarizer varies based upon the height of the wires and the wavelength of the light according to embodiments of the present invention.

FIG. 5 is a graph 500 illustrating that light transmission through a wire grid polarizer varies due to interference phenomena based upon the height of the wires and the wavelength of the light. As an example, three different wavelengths of light (e.g., 450 nm (blue), 550 nm (green), and 650 nm (red)) were directed through polarizers having heights varying from 50 nm to 300 nm. As shown in graph 500, it was found that a polarizer with a height of approximately 140 nm transmitted the maximum amount of 450 nm wavelength light; a polarizer with a height of approximately 180 nm transmitted the maximum amount of 550 nm wavelength light; and a polarizer with a height of approximately 220 nm transmitted the maximum amount of 650 nm wavelength light. Thus, by varying the height of the fine array lines based on the sub-pixel color upon which the lines are disposed, optimal transmission of the sub-pixel's light can be achieved. Note that pitch and width of the conductive lines can also be varied, either separately or in combination with height, to achieve optimal transmission.

Figure 6A:
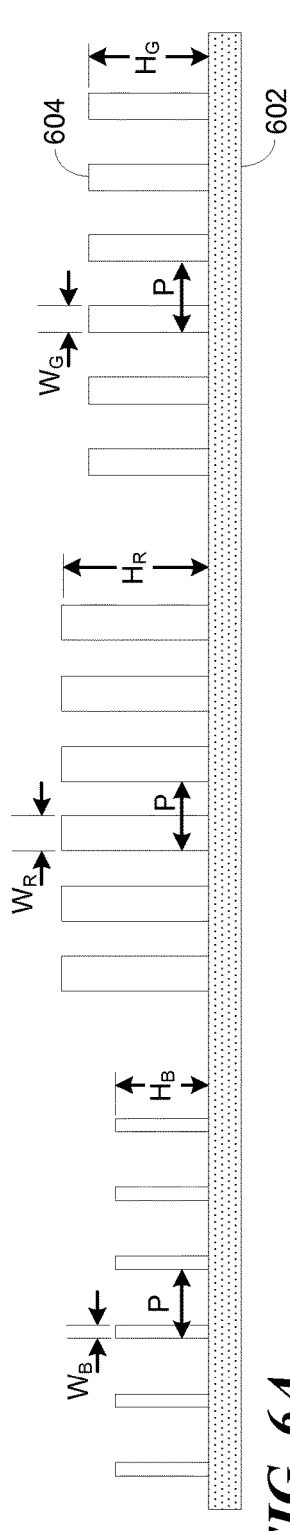
FIGS. 6A through 6C illustrate a second example method of manufacturing an EMI shielding optical polarizer apparatus according to embodiments of the present invention.
Figure 6B:
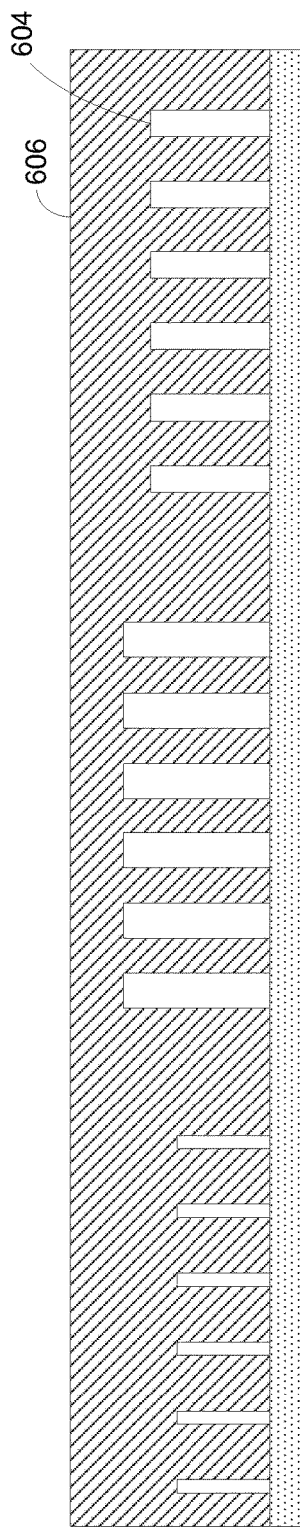
Figure 6C:
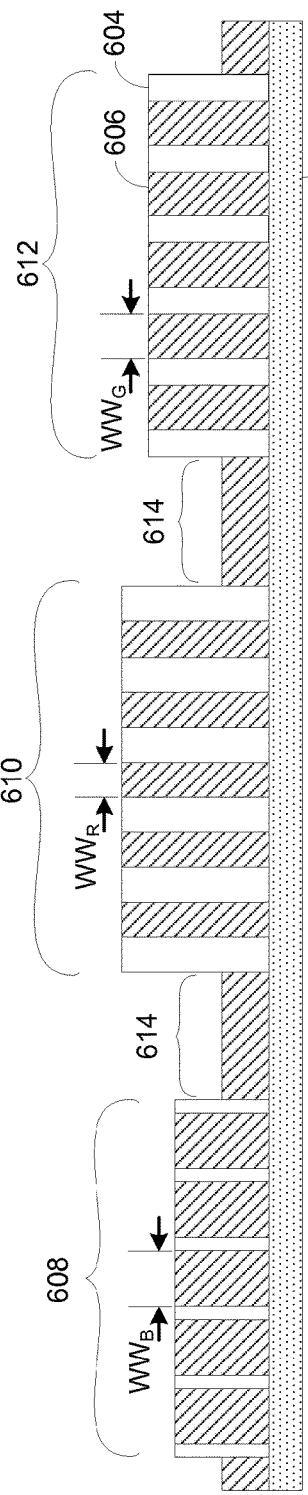

FIGS. 6A through 6C depict magnified cross-sectional views illustrating an example formation process of a small portion of a shielding reflective optical polarizer with varied conductive line heights. In FIG. 6A, a portion of a transparent substrate 602 is shown with varied height structures 604 formed thereon via imprint lithography or other suitable method. The varied height structures 604 are formed from, for example, a transparent resist material. In the depicted example embodiment, the varied height structures 604 are regularly spaced at a constant pitch P. Different heights $H_B$, $H_R$, and $H_G$ are selected for the varied height structures 604 corresponding to different sub-pixel colors (e.g., blue, red, and green). Likewise, different widths $W_B$, $W_R$, and $W_G$ are selected for the varied height structures 604 corresponding to different sub-pixel colors. The pitch P, the heights $H_B$, $H_R$, and $H_G$, and the widths $W_B$, $W_R$, and $W_G$ are selected to optimize light transmission through the varied height structures 604. For example, in some embodiments, $H_B$ can be selected to be approximately 140 nm to optimize (e.g., maximize) transmission of 450 nm wavelength blue light; $H_R$ can be selected to be approximately 220 nm to optimize (e.g., maximize) transmission of 650 nm wavelength red light; and $H_G$ can be selected to be approximately 180 nm to optimize (e.g., maximize) transmission of 550 nm wavelength green light. Likewise, in some embodiments, $W_B$ can be selected to be approximately 20% of the pitch P; $W_R$ can be selected to be approximately 49% of the pitch P; and $W_G$ can be selected to be approximately 38% of the pitch P. In some embodiments, the pitch P can be selected to be approximately 150 nm. Other values can be used.

As shown in FIG. 6B, a metal 606 deposition is next blanketed (e.g., via PVD) onto the varied height structures 604 and substrate 602 such that a substantially flat top surface is achieved. The metal 606 is selected to be reflective and can include aluminum or other metal. In FIG. 6C, after etching the metal 606, a pattern of varied height conductive, reflective lines fill the trenches between the varied height structures 604. For example, the height of the conductive, reflective lines 608 for polarizing blue 450 nm wavelength light is approximately equal to $H_B$; the height of the conductive, reflective lines 610 for polarizing red 650 nm wavelength light is approximately equal to $H_R$; and the height of the conductive, reflective lines 612 for polarizing green 550 nm wavelength light is approximately equal to $H_G$.

The width of the varied height structures 604 is selected to cause an approximately equal volume of metal 606 to be deposited in the trenches between the varied height structures 604. Having approximately equal volumes of metal 606 deposited in the trenches allows the etch process to consume the metal 606 at varying rates depending on how much top surface area is exposed to the etch. Since the varied height structures 604 are disposed at a constant pitch P, the wider the varied height structures 604, the narrower the trenches/wire widths ($WW_B$, $WW_R$, $WW_G$), the less top surface area is exposed to etching, the slower the etching proceeds where the trenches/wire widths are narrower, and the higher the resulting wire heights when etching is stopped. In other words, the width of the varied height structures 604 can be used to control the ultimate wire heights. The following table illustrates an example configuration based on the above example values.

| Pixel color | Height (nm) | Pitch (nm) | Coverage (%) | Wire Width (nm) |
|---|---|---|---|---|
| Blue | 140 | 150 | 20% | 30 |
| Green | 180 | 150 | 38% | 57 |
| Red | 220 | 150 | 49% | 74 |

The following table provides mathematical equations for calculating the above example values.

| Pixel color | Height (nm) | Pitch (nm) | Coverage (%) | Wire Width (nm) |
|---|---|---|---|---|
| Blue | $H_B$ | P | $C_B$ | $W_B = P * C_B$ |
| Green | $H_G$ | | $C_G = 1 - (H_B/H_G * (1 - C_B))$ | $W_G = P * C_G$ |
| Red | $H_R$ | | $C_R = 1 - (H_B/H_R * (1 - C_B))$ | $W_R = P * C_R$ |

Note that between the groups of reflective lines 608, 610, 612, wider and shorter metal lines 614 are formed. These metal lines correspond to the vertical lines in the coarse grid 300B of FIG. 3B.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s)

may be described with reference to one or more particular embodiments and/or drawings, it should be understood that such features are not limited to usage in the one or more particular embodiments or drawings with reference to which they are described, unless expressly specified otherwise.

The foregoing description discloses only example embodiments of the invention. Modifications of the above-disclosed apparatus, systems and methods which fall within the scope of the invention will be readily apparent to those of ordinary skill in the art. For example, the EMI shielding reflective optical polarizers described herein can be used with other types of displays in addition the displays depicted herein.

Accordingly, while the present invention has been disclosed in connection with exemplary embodiments thereof, it should be understood that other embodiments may fall within the spirit and scope of the invention, as defined by the following claims.

The invention claimed is:

1. A liquid crystal display system comprising:
a first shielding reflective optical polarizer;
a color filter disposed adjacent the first shielding reflective optical polarizer;
a thin film transistor and liquid crystal layer disposed adjacent the color filter;
a second shielding reflective optical polarizer disposed adjacent the thin film transistor and liquid crystal layer; and
a backlight assembly including a light source, a diffuser and a back reflector, the backlight assembly disposed adjacent the second shielding reflective optical polarizer; wherein:
at least one of the first and second shielding reflective optical polarizers includes a fine wire array of reflective and conductive lines and a coarse grid of reflective and conductive lines, the coarse grid of reflective and conductive lines formed on and electrically connected to the fine wire array of reflective and conductive lines, or the fine wire array of reflective and conductive lines formed on and electrically connected to the coarse grid of reflective and conductive lines.

2. The system of claim 1 further including one or more sensors disposed adjacent the first shielding reflective optical polarizer.

3. The system of claim 1 wherein the first and second shielding reflective optical polarizers each include a respective one of the fine wire array of reflective and conductive lines.

4. The system of claim 3 wherein the fine wire arrays are formed via imprint lithography.

5. The system of claim 3 wherein the fine wire arrays are spaced and dimensioned to polarize visible light and the coarse wire array is not spaced and dimensioned to polarize visible light.

6. The system of claim 1 wherein the first and second shielding reflective optical polarizers each include a respective one of the coarse grid of reflective and conductive lines.

7. The system of claim 6 wherein the coarse grids are patterned to match a pattern of the color filter.

8. A polarizer apparatus comprising:
a fine wire array of optically reflective and electrically conductive lines; and
a coarse grid of optically reflective and electrically conductive lines, wherein the coarse grid is electrically connected to the fine wire array and patterned to match a separate black matrix of a liquid crystal display, the separate black matrix including pixels and thin film transistors of the liquid crystal display, wherein
the fine wire array and the coarse grid are formed one on top of one another such as to be electrically connected.

9. The apparatus of claim 8 further including a grounding frame electrically connected to the fine wire array, the coarse grid, and an electrical ground.

10. The apparatus of claim 8 wherein the fine wire array is formed via imprint lithography.

11. The apparatus of claim 8 wherein the coarse grid is patterned to match a pattern of a color filter of a liquid crystal display.

12. The apparatus of claim 8 wherein the fine wire array and the coarse grid are integrally formed in a single layer.

13. A method for manufacturing a polarizer apparatus, the method comprising:
forming a fine wire array on a substrate wherein the fine wire array includes conductive and reflective lines;
forming a coarse grid on the fine wire array wherein the coarse grid includes conductive and reflective lines and is patterned to match a black matrix of a liquid crystal display, the black matrix including pixels and thin film transistors of the liquid crystal display, and the fine wire array and the coarse grid are formed one on top of one another such as to be electrically connected; and
electrically connecting the fine wire array and the coarse grid to a grounding terminal.

14. The method of claim 13 further including aligning the fine wire array and the coarse grid with a color filter of an LCD system.

* * * * *